E. STANLEY.
PNEUMATIC TIRE.
APPLICATION FILED NOV. 11, 1910.

1,064,391.

Patented June 10, 1913.

Witnesses
A. G. Hague
W. A. Loftus

Inventor
Enos Stanley
by J. Ralph Durvig atty

UNITED STATES PATENT OFFICE.

ENOS STANLEY, OF DES MOINES, IOWA.

PNEUMATIC TIRE.

1,064,391.  Specification of Letters Patent.  Patented June 10, 1913.

Application filed November 11, 1910. Serial No. 591,768.

*To all whom it may concern:*

Be it known that I, ENOS STANLEY, a citizen of the United States, residing at Des Moines, in the county of Polk and State of Iowa, have invented a certain new and useful Pneumatic Tire, of which the following is a specification.

In the manufacture of rubber pneumatic tires and particularly inner tubes for rubber tires, it is customary to combine with the pure rubber a material such, for instance, as powdered sulfur, for the purpose of giving it a certain degree of firmness and for preventing it from adhering to other articles so that it may be conveniently and easily shipped, packed and handled. This combining of the sulfur or other material with the pure rubber detracts to a certain extent from its elasticity and hence makes it more liable to be punctured than though the pure rubber itself is used.

My object is to provide a pneumatic tire in which the inner surface of the inner tube may be rendered highly elastic so that a nail or other object extended through the outer tube and partially through the inner tube will cause the highly elastic inner layer of the inner tube to stretch in such a manner as to avoid being punctured.

A further object is to provide a composition to be placed on the interior of a pneumatic tire for acting upon the inner layer of the inner tube for the purpose of rendering said inner layer highly elastic.

A further object is to provide a pneumatic tire which, when in use, will become warmed to a slight degree only to thereby avoid deterioration of the material of which the tire is made and to avoid the loosening of patches secured to the inner tube by means of the various materials commonly used for such purposes.

A further object is to provide a tire which as originally constructed may be sufficiently firm and non-adhesive as to be readily and easily handled, packed and shipped and then after it has been inflated and put in use the inner layer of the tire may be made soft and highly elastic to thereby minimize its liability to puncture and at the same time produce this desirable result without making the outer layer of the inner tube soft or sticky which would make it objectionable to handle.

Figure 2:
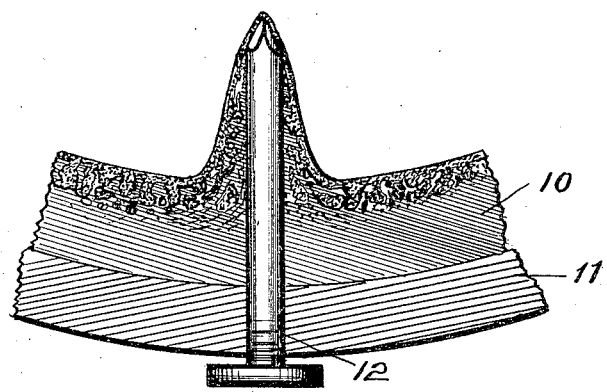
Figure 1:
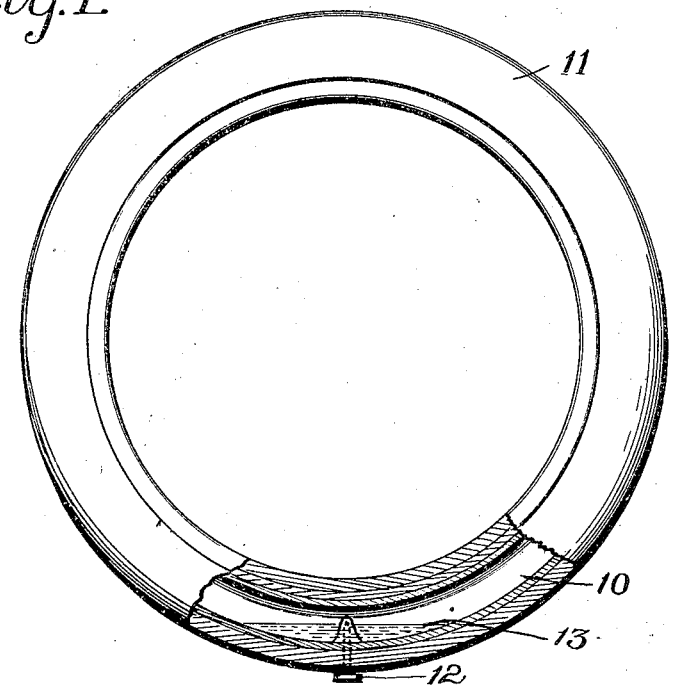

My invention consists in the combination of the materials used in treating pneumatic tires, whereby the objects contemplated are attained, as hereinafter more fully set forth, pointed out in my claims and illustrated in the accompanying drawings, in which:

Figure 1 shows a side elevation of a pneumatic tire, partly in section, and having a quantity of my improved composition contained therein. Said view also shows a nail extended through the outer tube to illustrate the manner in which the inner portion of the inner tube will stretch and expand around the end of the nail and prevent a puncture of the tire, and Fig. 2 shows an enlarged, detail, sectional view of a part of the inner tube of a pneumatic tire and a nail embedded therein to illustrate the manner in which the inner portion of the inner tube stretches and expands around the nail and also illustrating the difference in the composition of the inner layer of the inner tube after being treated.

In the accompanying drawings, I have used the reference numeral 10 to indicate the outer tube of the pneumatic tire, 11 the inner tube and 12 a nail projected into the inner tube, and 13 a quantity of a compound contained within the inner tube. The formula under which the compound is made comprises a quantity of resin or gum, preferably orange gum, in flake form, a solvent for the orange gum of a material that will not dissolve rubber such, for instance, as wood alcohol and an element that will dissolve sulfur, or the like and that will also tend to prevent the orange gum from solidifying and hardening. I preferably employ these elements in about the following proportions: 79 parts wood alcohol, 20 parts orange gum, 1 part carbon disulfid.

In compounding the ingredients I preferably first mix the orange gum and carbon disulfid and then add the alcohol and leave the material stand for a period of approximately forty-eight hours without agitation as I have found that if agitated there is likely to be a precipitation or sediment. Further after the ingredients have stood without agitation for a sufficient period of time the mixture will form a fluid that flows readily and which, when placed in the interior of a pneumatic tire, will retain its fluid condition for a period of approximately a year without any material amount of thickening or hardening.

In the construction of the inner tubes of pneumatic tires it is customary to employ a small amount of a material that will, to a certain extent, harden the tubes so that it may be readily and easily shipped and handled. It is also customary to place on both the interior and exterior of an inner tube a quantity of material in powdered form that will tend to prevent two contacting surfaces of rubber from adhering to each other. The material for this purpose that is usually employed is sulfur or pumice-stone in finely powdered condition. I have found that the compound before described has the property of dissolving the sulfur, or other similar material on the inner surface of the inner tube and so far into the material of which the inner tube is formed as the compound may penetrate. Inasmuch as my improved compound does not have the property, at least to any material extent, of dissolving rubber, it will penetrate into the inner tube only a comparatively slight distance and the sulfur, or the like with which it comes in contact will be dissolved and the orange gum element of my improved composition will, to a certain extent, combine with the rubber on the inner layer of the inner tube in such a manner as to produce a very soft, highly elastic layer composed partly of the material of which the tire is formed and partly of the orange gum. I have found that when a quantity of the composition is placed on the interior of a pneumatic tire and has been brought into contact with the inner surface of the inner tube for a short period of time it will make the inner layer of the inner tube so soft and highly elastic that a nail or the like inserted through the outer tube and against the inner tube will not project through the inner layer of the inner tube but will stretch the material adjacent to the inner surface of the inner tube so that it will surround the end of the inserted nail or other object and thus avoid a puncture of the tube.

Another advantage in the use of my improved composition is that it may be inserted in a pneumatic tube that has lost a considerable portion of its elasticity by exposure to the air so as to render it unfit for use as an inner tube of a pneumatic tire and when so inserted it will restore to the inner layer, at least, of the inner tube, a sufficient degree of elasticity to make it serve its purpose as an inner tube.

Another advantage that I have discovered by the use of my improved tire is that the tire, when in use, will not become warmed or heated as rapidly as ordinary tires without my improved composition, due to the fact that, on account of the increased elasticity, the friction is reduced and also to the fact that, when in use, there is a certain amount of evaporation that takes place of the volatile elements of the compound, which elements again condense after agitation has ceased, or the tire is at rest.

In constructing my improved tire, I first form the inner tubes with the proportion of sulfur or other stiffening material commonly used so that they may be readily packed and handled, I then inflate the inner tube so that the adjacent surfaces are held apart, and at a later time I add my improved composition for the purpose of making the inner layer soft and elastic.

It obviously is not desirable to treat the inner layer in such a manner as to render it soft and highly elastic until after the tire is inflated and put into use, as otherwise the material would not be properly mixed and brought in contact with the entire inner surface and the contacting portions of the inner surface would tend to adhere to each other. Further, by employing my improved tire and using sulfur or other material in the construction of the inner tube originally, and then after it has been inflated and placed in use, inserting a composition therein that will dissolve such material and render the inner layer highly elastic, I overcome the objectionable features which would be present in a tire originally manufactured with a soft, sticky, highly elastic inner surface.

In the foregoing description I have referred to the inner tube of a pneumatic tire. In some instances pneumatic tires are made of a single tube.

I do not desire to be understood as limiting myself to the use of my improved composition or my improved construction in connection with double tube tires as, obviously, advantageous results can be produced in the use of my invention in connection with the use of single tube tires.

I claim as my invention:

1. The combination with a pneumatic tire, of a composition on the interior of tire containing a solvent for the material used in thickening the pneumatic tire and also acting to prevent thickening and hardening of the compound, and a gummy substance contained in said compound capable of mixing with the inner portion of the tire and rendering the same soft and highly elastic.

2. The combination with a pneumatic tire, containing rubber and an element for thickening the rubber, of a composition comprising a solvent for said thickening material, a gum to enter the interstices formed by the dissolving of the rubber thickening material to render the inner layer of the rubber softer and more elastic than the outer layer.

3. The combination with a pneumatic tire, of a compound contained within the tire and comprising a solvent for sulfur, pumice-stone or the like, and a gum capable of being maintained in liquid form by said solvent.

4. The combination with a pneumatic tire, of a compound contained within the tire and comprising a solvent for sulfur, pumice-stone or the like, and a gum capable of being maintained in liquid form by said solvent, the compound thus formed being also capable of uniting or mixing with the inner layer of the tire to render it soft and highly elastic.

5. The combination of a pneumatic tire, of a composition contained within the tire and comprising alcohol, a gum and carbon disulfid.

Des Moines, Iowa, November 8, 1910.

ENOS STANLEY.

Witnesses:
MARY WALLACE,
W. A. LOFTUS.

Copies of this patent may be obtained for five cents each, by addressing the "Commissioner of Patents, Washington, D. C."